US006989181B2

(12) United States Patent
Brandt

(10) Patent No.: US 6,989,181 B2
(45) Date of Patent: Jan. 24, 2006

(54) GLASS CONTAINER WITH IMPROVED COATING

(75) Inventor: Thomas Lynn Brandt, Windsor, NY (US)

(73) Assignee: Heineken Technical Services B.V., Amsterdam (NL)

( * ) Notice: Subject to any disclaimer, the term of this patent is extended or adjusted under 35 U.S.C. 154(b) by 20 days.

(21) Appl. No.: 10/381,894

(22) PCT Filed: Oct. 2, 2001

(86) PCT No.: PCT/NL01/00722

§ 371 (c)(1),
(2), (4) Date: Jul. 11, 2003

(87) PCT Pub. No.: WO02/28732

PCT Pub. Date: Apr. 11, 2002

(65) Prior Publication Data

US 2004/0096588 A1    May 20, 2004

(30) Foreign Application Priority Data

Oct. 2, 2000  (EP) .................................. 00203403

(51) Int. Cl.
*B32B 1/02* (2006.01)

(52) U.S. Cl. ................................... 428/34.7; 427/385.5
(58) Field of Classification Search ............... 428/34.7; 427/385.5
See application file for complete search history.

(56) References Cited

U.S. PATENT DOCUMENTS

| 3,864,152 A |   | 2/1975  | Kitamura et al. |
| 3,907,974 A | * | 9/1975  | Smith ......................... 428/346 |
| 3,937,676 A |   | 2/1976  | Shonebarger et al. |
| 3,966,474 A |   | 6/1976  | Harper |
| 3,976,819 A |   | 8/1976  | Mori et al. |
| 4,099,638 A |   | 7/1978  | Tatsumi et al. |
| 5,997,960 A |   | 12/1999 | Brandt et al. |

FOREIGN PATENT DOCUMENTS

| EP | 0 624 404 A2 | 11/1994 |
| GB | 1 503 018 A  | 3/1978  |

* cited by examiner

*Primary Examiner*—Alexander S. Thomas
(74) *Attorney, Agent, or Firm*—Pearne & Gordon LLP

(57) ABSTRACT

The invention is directed to a glass container having provided on at least one surface thereof a polymer based coating and/or a polymer label, said surface being provided with a precoating of at least one polyvinyl alcohol, underneath said polymer based coating and/or a polymer label.

24 Claims, No Drawings

GLASS CONTAINER WITH IMPROVED COATING

The invention is directed to a glass container, especially a bottle for holding liquid materials, having improved surface characteristics. More in particular the invention is directed to a glass container having a polymeric precoating on the surface thereof, which precoating is suitable for improving the characteristics of the surface, more in particular for improving the adhesion of further polymeric materials, such as further coatings and/or polymer based label materials thereon.

Glass containers are currently labeled in various different ways. The predominant method is printed paper labels glued to the container at the time of filling and sealing. Such labels offer almost unlimited art potential and are commonly used on food and beverage containers, which can either be utilized for the returnable and non-returnable market. This is the lowest cost technique, but offers little resistance to label damage. Also, the glue systems used are a constant source of problems in high speed bottle filing operations.

A second, and more recently developed, container labelling technique is that of applying a thin Styrofoam label to cover the container from shoulder to heel, with the decorative and/or informational material being printed on a more dense outer skin of the Styrofoam label. This is widely used on lighter-weight one-way bottles common in the beverage industry. It offers some impact resistance and a large surface area for printing product information and instructions, as well as company logos. Of necessity, it covers a majority of the container and prevents visual inspection of the contents by the consumer. In addition, it is more costly than the paper label, has little durability and becomes easily soiled. Because the printing surface is relatively rough, high definition printing is not possible. It also becomes a contaminate at the glass recycling center as well as at the glass plant when remelting the container.

A third container labelling technique is that of printing ceramic ink directly on the container surface using a screen printing technology. While the label appearance is generally good, the technique is typically limited to two or three colors due to cost considerations.

However, both the direct printing ceramic ink and ceramic ink decal techniques require subsequent high temperature firing to fuse the ink to the glass substrate. In addition, while the preprinted ceramic ink label reduces the technical problems somewhat, both techniques require extreme attention to detail, a high level of maintenance and are run off-line at slow speed, with high labor costs. Due to the high cost, ceramic inks are the least commonly used labelling technique.

Another technique for labelling containers is based on image transfer, i.e a technique wherein an ink image is transferred from a film-substrate to the glass. This method has distinct advantages over the conventional labelling techniques, especially with respect to the ability to steer the quality, durability and applicability of the, images.

An important factor influencing the strength of any given container is the degree to which the outer surface has been scratched, abraded or flawed, where this surface damage occurs and how subsequent internal pressure or external forces are applied. Because of the countless combinations possible, it is beneficial to protect the outer glass container surface from damage.

To date, protection of the outer surface of the container has been accomplished by surface treatment during the container manufacturing process, using vapor and spray devices to provide lubricity to the contact surfaces before the containers are subjected to the potentially damaging automatic conveying, inspection, packing, washing, fling and labeling operations.

During those conveying operations, the containers are subject to considerable line pressures as well as abrading of one container against another. Surface damage may result and, if severe enough, may result in a weakened or broken bottle. As glass container production rates increase, the frequency and severity of impact and abrasion increases.

The very thin film protective cold end coating provided by the techniques practiced today, provide some abrasion protection but little impact protection.

Present day techniques include the use of a so-called cold-end coating on the glass after manufacture. Typically this coating is based on applying a polyethylene type material on the surface of the glass of the beverage containers. This coating is generally applied by spraying or otherwise distributing a polyethylene based material on the surface, which material is distributed as small dots on the surface when dry. As is well known, this polyethylene material has a very low dyne level/surface energy and as such it is very difficult to apply any material on top of it. More in particular adhesives for labels and other coating materials do not adhere well to this type of cold-end coating.

Food or non-pressurized container types will utilize a variant of oleic acid in a continuous thin film. This material is typically applied as a vapor via a heated pressurized hood.

Accordingly it is an object of the present invention to provide an, improved coating for glass that may replace the presently used cold-end coatings having FDA approval, while having on the one hand at least the good lubricity of the presently used polyethylene or oleic acid materials, and on the other hand not having the disadvantages like poor adhesion of further materials to be applied on top of said precoating, such as polymer based labels or protective or decorative coatings.

A further object of the invention is to provide short term lubricity precoatings to glass bottles, namely the lubricity needed for transport after production, packaging and transport. It is important to provide the container with short term lubricity both for line flow characteristics and in order to protect the glass surface from abrasion damage. Micro scratches and/or surface impacts will weaken the structural integrity of the container that could ultimately lead to breakage in the customer's filling line. Any cold-end coating would need an FDA approval because of the open top application requirement. As such, few materials would be applicable for in-line application at a container manufacturing plant. PVA satisfies this requirement and in fact is used as a food additive in some products The invention is based on the surprising discovery that the use of a polyvinyl alcohol coating as a cold-end base coating for a glass bottle, underneath a polymer based coating or a polymer based label, provides superior properties to the glass bottle in terms of adhesion and abrasion resistance.

PVA being known as an adhesion promoter for such products as latex, chewing gum and adhesives fulfills these requirements. Finding a material that has the ability to provide short-term lubricity, FDA approval, and to act as an adhesion promoter is truly unique. This, combined with the fact that PVA can be applied utilizing existing application hardware and relatively the same oven temperatures, makes it ideal for use with polymer based coating or labels.

Accordingly the invention, in its broadest sense is directed to a glass container having provided on at least one surface thereof a polymer based coating and/or a polymer label, said surface being provided with a precoating of at least one polyvinyl alcohol, underneath said polymer based coating and/or polymer based label.

DESCRIPTION OF DETAILED EMBODIMENTS

The present invention, in more detailed embodiments, can accordingly be applied in two important areas, namely in the area of applying a polymer based (as opposed to paper based) labels and in the area of applying a protective or decorative coating on glass bottles.

In the first embodiment the invention is applied in the area of glass bottles having a label based on polymer, i.e a polymer film label or a so-called ink-only label, based on image transfer techniques. A general disclosure of this technique is for example disclosed in WO-A 9005088 and WO-A 9005353. Other embodiments of the image transfer system are disclosed in WO-A 9734810, WO-A 0735292, WO-A 9735291 and WO-A 9735290. The contents of all six applications is incorporated herein by way of reference.

In the second embodiment the invention is applied in the area of glass bottles having a protective or decorative coating, such as disclosed in U.S. Pat. Nos. 5,686,188 and 5,997,960, the contents of which is incorporated herein by way of reference.

To receive these protective or decorative coatings, the containers are conveyed into a single station or multi-station spray system which have been designed to address the needs of uniform coverage of the container, capture and/or recycling of the overspray. The residual heat in the container is adequate to flash off the solvent or water carrier at an accelerated rate. The flashing off of the solvent or water carrier will occur at the elevated bottle temperature in the subsequent labelling. If no such labelling system is used, other heating must be provided, e.g., hot air, to prevent trapping of solvent or water carrier which would otherwise weaken or deteriorate the coating.

Sufficient space is allowed between the spray booth and the cure chamber for flash to occur.

In the event the materials are sprayed, it is desirable to prevent any material from contacting the finish of the container. This is the area including the opening, top seal surface, thread or closure cover area and take out bead immediately below. This could be accomplished using a container gripper device designed to completely cover the area described above, e.g., with a split housing which, when closed, dovetails to form a barrier to the spray material. Dipping and flow coating are other processes that may be used to apply the coating.

The gripper devices are attached to a conveyor network whose design allows for spacing of the glass containers to optimize the coating and curing of the coating materials. The grippers should also be designed for rotating the container at the spraying and curing positions to insure uniform coating and processing.

Rather than spraying, the application of the, coating solution could be accomplished by belt or roller coating. Alternative methods of applying the topcoat include, but are not limited to the use of a roller shaped to conform to the contour of the container, a belt flexible enough to conform to the container contour, or flowing the coating over the container while it is slowly rotated. Dipping may also be advantageous. Each option, has its own merits and must be weighed against economics, quality and production rates.

In the said first embodiment of the invention, an image or a label is applied to the glass surface by known techniques. Prior to the application of the label or the image, the glass surface has been precoated with the polyvinyl alcohol. Contrary to the situation where the conventional polyethylene coating was used, the process of the invention does not require the coating to be removed at the area where the label or image is to be applied. The precoating itself actually improves the adhesion of the polymeric label and the image, instead of deteriorating it, as the prior art materials.

This label application may be either magazine fed or roller fed, depending on the specifics of the bottles, applicator type and the like.

In case of image transfer, preferably the processes disclosed in the above referenced International patent applications are used.

In the second embodiment, the use of protective and/or decorative coatings, the coating can be applied over the polyvinyl alcohol coating, after drying thereof, in the same manner as described for applying the PVA coating.

The PVA coating can easily be applied as an aqueous solution or emulsion, depending on the molecular weight and degree of hydrolysis. A preferred range of molecular weight is between 10,000 and 500,000, as within these ranges the positive effects on the properties of the coating are the most pronounced. The degree of hydrolysis, i.e. the amount of ester groups converted to hydroxyl groups is preferably at least 87%, more in particular at least 95% and with the most preference at least 99%. This degree of hydrolysis also influences the properties of the coating.

The amount of PVA in the aqueous solution or emulsion is generally between 0.1 and 10 wt. %, preferably between 0.25 and 5 wt. %. This amount is selected in such way, that the correct amount of precoating is applied evenly on the surface of the glass. The viscosity plays an important role therein, which in its turn is determined by the molecular weight of the PVA and the amount in the aqueous system. Generally viscosities in the range of 5 to 35 seconds are preferred (20° C., #2 Zahn cup).

The amount of PVA applied to the surface of the glass substrate may vary between wide ranges, depending on the required properties of the coated surface. This amount is generally determined by the resulting slip angle as measured on industrial standard laboratory equipment, i.e. American Glass Research (tilt table), which is preferably between 14 and 25°. Amounts of PVA on the surface are then generally between 0.2 and 2 $mg/dm^2$.

In certain cases it may be advantageous to modify the PVA for example with silane or siloxane, to improve the adhesion properties even further. On the other hand, it may be advantageous to include a silane treatment of the glass prior or subsequent to the application of the PVA coating.

Finally, it is also possible to use the PVA coating after the image or the label has been applied to the glass surface, optionally as a second coating, the first coating being PVA or non-PVA.

The invention is now elucidated on the basis of a number of Examples, which are to provide a better understanding, but not a limitation of the invention.

EXAMPLES 12 oz long neck beer bottles were prepared in various ways and provided with an acrylic color coating in a thickness of 12 $\mu$m. The bottles were tested in a line simulator, wherein the time until surface failure was determined during wet line abrading. The setting of the line simulator corresponded to a line of 972 bottles per minute and a slip angle of 35°.

In table 1 the type of pretreatment of the bottle prior to applying the acrylic color coating, has been given, and in table 2, the results of the line abrading test are given. The acrylic coating was applied on the precoating, if any, without further additional surface treatment.

TABLE 1

| Example | Precoating |
|---|---|
| 1 | None |
| 2 | Polyethylene |
| 3 | Mono stearate (acidic) |
| 4 | Mono stearate |
| 5 | Sodium stearate |
| 6 | Polyvinyl alcohol |

TABLE 2

| Example | Level of pretreatment coating | Time to failure (min) |
|---|---|---|
| 1 | — | 14 |
| 2 | Low | 3 |
| 2 | Medium | 8 |
| 2 | High | 12 |
| 3 | Low | 12 |
| 3 | Medium | 14 |
| 3 | High | 16 |
| 4 | Low | 8 |
| 4 | Medium | 12 |
| 4 | High | 14 |
| 5 | Low | 14 |
| 5 | Medium | 16 |
| 5 | High | 16 |
| 6 | Low | 24 |
| 6 | Medium | 28 |
| 6 | High | 59 |

The results clearly show that the use of polyvinylalcohol as coating provides for a superior result in the adhesion of the acrylic coating.

What is claimed is:

1. Glass container having provided on at least one surface thereof a polymer based coating and/or a polymer label, said surface being provided with a precoating of at least one polyvinyl alcohol in an amount of up to 2 mg/dm$^2$, underneath said polymer based coating and/or a polymer label.

2. Container according to claim 1, wherein the said surface has been provided with a label.

3. Container according to claim 2, wherein said label is based on a polymeric film carrying label graphics or on an ink-only image transfer system.

4. Container according to claim 1, wherein said coating is durable, lubris, highly impact resistant and enhances the appearance of the glass container to which it is applied.

5. Container according to claim 4, wherein the said coating is applied over a label.

6. Container according to claim 4, wherein the said label is a polymeric or a paper label.

7. Container according to claim 1, wherein the polyvinyl alcohol coating is applied over a silane treated glass surface, or a silane treatment is applied over the polyvinyl alcohol coating.

8. Container according to claim 1, wherein a silane modified polyvinyl alcohol is used.

9. Container according no claim 1, wherein a further coating, such as a polyethylene coating is applied over the polyvinyl alcohol coating label.

10. Container according to claim 1, wherein the polyvinyl alcohol has a molecular weight of 10,000 to 500,000.

11. Container according to claim 1, wherein the polyvinyl alcohol is defined by a degree of hydrolysis of over 87%.

12. Container according to claim 1, wherein the amount of polyvinyl alcohol coating is between 0.2 and 2 mg/dm$^2$.

13. Container according to claim 1, wherein the amount of polyvinyl alcohol coating is such that the surface has a slip angle of 14 to 25°.

14. Process for providing a coated and/or labelled glass container, said process comprising providing a glass container, applying a polyvinyl alcohol precoating on the glass container by treating the surface of the said glass container with an aqueous solution of the polyvinyl alcohol drying the precoating to provide said precoating in a amount of up to 2 mg/dm$^2$ and applying a label and/or a further coating over the precoating.

15. Process according to claim 14, wherein the amount of polyvinyl alcohol coating is between 0.2 and 2 mg/dm$^2$.

16. Process according to claim 14, wherein the aqueous solution contains between 0.1 wt %, of polyvinyl alcohol.

17. Process according to claim 14, wherein the aqueous solution is applied by spraying, dipping or roller coating.

18. Process according to claim 14, wherein the precoating is applied at a temperature of between 150 and 250° F.

19. Process according to claim 14, wherein the precoating is applied on the surface of silane treated glass or a silane treatment is applied on the precoating.

20. Process according to claim 14, wherein a label based on a polymeric film carrying label graphics or on an ink-only image transfer system is applied over the precoating.

21. Process according to claim 14, wherein a further polyethylen coating is applied.

22. Process according to claim 14, wherein a further coating which is durable, highly impact resistant and enhances the appearance of the glass container, is applied over the said polyvinyl alcohol precoating.

23. Process according to claim 22, wherein the said coating is selected from the group of curable acrylics, urethanes, acrylic-urethanes and epoxies.

24. Process according to claim 14, wherein the said polyvinyl alcohol coating is applied on uncoated glass.

* * * * *

UNITED STATES PATENT AND TRADEMARK OFFICE
CERTIFICATE OF CORRECTION

PATENT NO. : 6,989,181 B2  Page 1 of 1
DATED : January 24, 2006
INVENTOR(S) : Thomas Lynn Brandt It is certified that error appears in the above-identified patent and that said Letters Patent is hereby corrected as shown below:

<u>Column 6,</u>
Line 11, after "coating" delete "label".
Line 25, after "alcohol" insert -- , --.
Line 26, after "in" delete "a" and insert -- an --.
Line 32, after "0.1" insert -- and 10 --.
Line 32, after "%" delete ",".
Line 44, delete "polyethylen" and insert -- polyethylene --.

Signed and Sealed this

Sixth Day of June, 2006

JON W. DUDAS
*Director of the United States Patent and Trademark Office*